United States Patent
Rabe et al.

(10) Patent No.: US 11,144,572 B2
(45) Date of Patent: Oct. 12, 2021

(54) CENTRALIZED CONFIGURATION DATABASE CACHE

(71) Applicant: HEWLETT PACKARD ENTERPRISE DEVELOPMENT LP, Houston, TX (US)

(72) Inventors: Bruce Rabe, Dedham, MA (US); Isao Yanagimachi, Boxborough, MA (US); Kavitha Shravani Ravilla, Natick, MA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 177 days.

(21) Appl. No.: 16/049,542

(22) Filed: Jul. 30, 2018

(65) Prior Publication Data
US 2020/0034459 A1    Jan. 30, 2020

(51) Int. Cl.
  *G06F 16/27* (2019.01)
  *G06F 16/21* (2019.01)
  *G06F 16/2455* (2019.01)

(52) U.S. Cl.
  CPC ............ *G06F 16/27* (2019.01); *G06F 16/217* (2019.01); *G06F 16/24552* (2019.01); *G06F 16/273* (2019.01)

(58) Field of Classification Search
  CPC ............ G06F 11/1004; G06F 11/2097; G06F 16/1748; G06F 16/178; G06F 16/2219; G06F 16/2365; G06F 16/27; G06F 16/951; G06F 16/9566; G06F 2201/85; G06F 3/0619; G06F 3/0626; G06F 3/0644; G06F 3/065; G06F 3/067; G06F 16/1744; G06F 16/275; G06F 16/273; G06F 16/217; G06F 16/24552
  See application file for complete search history.

(56) References Cited

U.S. PATENT DOCUMENTS

| | | | |
|---|---|---|---|
| 8,266,101 B1 | 9/2012 | Shuai | |
| 9,231,988 B2 | 1/2016 | Holt et al. | |
| 9,607,071 B2 | 3/2017 | Stringham | |
| 9,667,736 B2 | 5/2017 | Gunda et al. | |
| 2015/0227600 A1* | 8/2015 | Ramu | G06F 16/27 707/654 |
| 2017/0132695 A1* | 5/2017 | Shannon, Jr. | G06Q 30/0611 |

OTHER PUBLICATIONS

Thorsten Schutt et al., "Efficient Synchronization of Replicated Data in Distributed Systems," 2003, pp. 1-10, Springer-Verlag Berlin Heidelberg.

* cited by examiner

*Primary Examiner* — Truong V Vo
(74) *Attorney, Agent, or Firm* — Hewlett Packard Enterprise Patent Department (57) ABSTRACT

Example implementations relate to synchronizing configuration dataset information from independent cluster groups. In an example, an aggregator selects nodes to each represent a different respective cluster group of a plurality of independent cluster groups. The aggregator establishes a respective server-sent event channel with each of the nodes. The aggregator receives, from a node, transaction log information representing changes to a configuration database associated with the independent cluster group represented by the node. The aggregator plays back the received transaction log information, which is in the form of database statements, into a centralized configuration database cache.

20 Claims, 6 Drawing Sheets

CENTRALIZED CONFIGURATION DATABASE CACHE

BACKGROUND

Electronic systems such as computers may be networked together to form a cluster of electronic systems. In some clusters, the electronic systems may share processing resources or storage resources. Some aspects of the electronic systems may be managed commonly at the cluster level.

BRIEF DESCRIPTION OF THE DRAWINGS

Various examples will be described below with reference to the following figures.

Throughout the drawings, identical reference numbers may designate similar, but not necessarily identical, elements.

DETAILED DESCRIPTION

Electronic systems may be connected together to form a cluster of electronic systems. Some examples of electronic systems that can join a cluster include servers, storage systems, hyperconverged systems (e.g., a system that combines storage, computing, and/or networking into a single appliance, typically providing an execution environment for running applications in virtual machines running on top of a hypervisor), and the like. Electronic systems connected in a cluster may also be referred to as nodes. The nodes may be connected by a wired and/or wireless network, such as a local area network, a wide area network, or the like. Within a cluster, processing or storage resources may be shared between nodes. Some aspects of the nodes may be managed commonly at the cluster level, such as setting and managing data backup policies.

In some implementations, multiple clusters may be organized into a cluster group. Membership in a cluster group may be secured by authentication and authorization to provide for secure intra-group communication and data exchange. Different cluster groups may be independent of one another and have different policies or configurations. Some example systems may also provide for a cluster or node to be a member in more than one cluster group.

A federation may be created by formed by joining multiple clusters or multiple cluster groups via networking. A federation may be scaled-out by adding additional nodes to provide additional compute, storage, or other resources to a cluster. Clusters, cluster groups, and federations may operate in a distributed manner, in that actions may be performed across nodes in a coordinated manner. Some aspects of the clusters or cluster groups of the federation may be managed commonly at the federation level, and more particularly, at a centralized point or centralized manager in the federation. In some systems, a virtual machine running on a node may serve as a centralized manager of the federation.

However, as a federation grows by scaling-out, information about the operation of the nodes, clusters, and/or cluster groups needed by the centralized manager also grows. Moreover, clusters or cluster groups in a federation may be independent and may not communicate with each other for various reasons, such as by design or by technical constraint. The speed and efficiency by which such information can be collected at the central manager may affect the responsiveness and quality of federation management actions. For example, distributed queries of each cluster and aggregation of the query results by a federation manager can be slow and all results may need to be collected before any sorting or chunking of the information can be performed. Moreover, some approaches to polling each cluster (e.g., using a REST query with a JSON payload) may require parsing and converting the query results before information can be used by or stored at the centralized manager. Thus, it may be useful to provide for efficient synchronization of information in a multi-cluster scaled environment.

Examples described herein may relate to an aggregator that selects nodes with which to synchronize configuration database information, where each node representing a different respective cluster or cluster group. The aggregator receives, from each node, transaction log information representing changes to a configuration database of that node's cluster group and plays back the received transaction log information into a centralized configuration database cache. In particular, the transaction log information is in the form of database statements, thus allowing the aggregator to efficiently play back the transaction log information into the aggregator cache without parsing, conversion, interpretation, or the like. Moreover, the nodes may transmit transaction log information based on a set of triggers in the node configuration database, thus efficiently transmitting only changes to the configuration database information. By virtue of an aggregator synchronizing configuration database information with nodes in this manner for independent clusters or cluster groups, a centrally managed clustered system can be scaled out to a high degree while maintaining fast, efficient synchronization of information for use by the aggregator in management functions.

Figure 1:
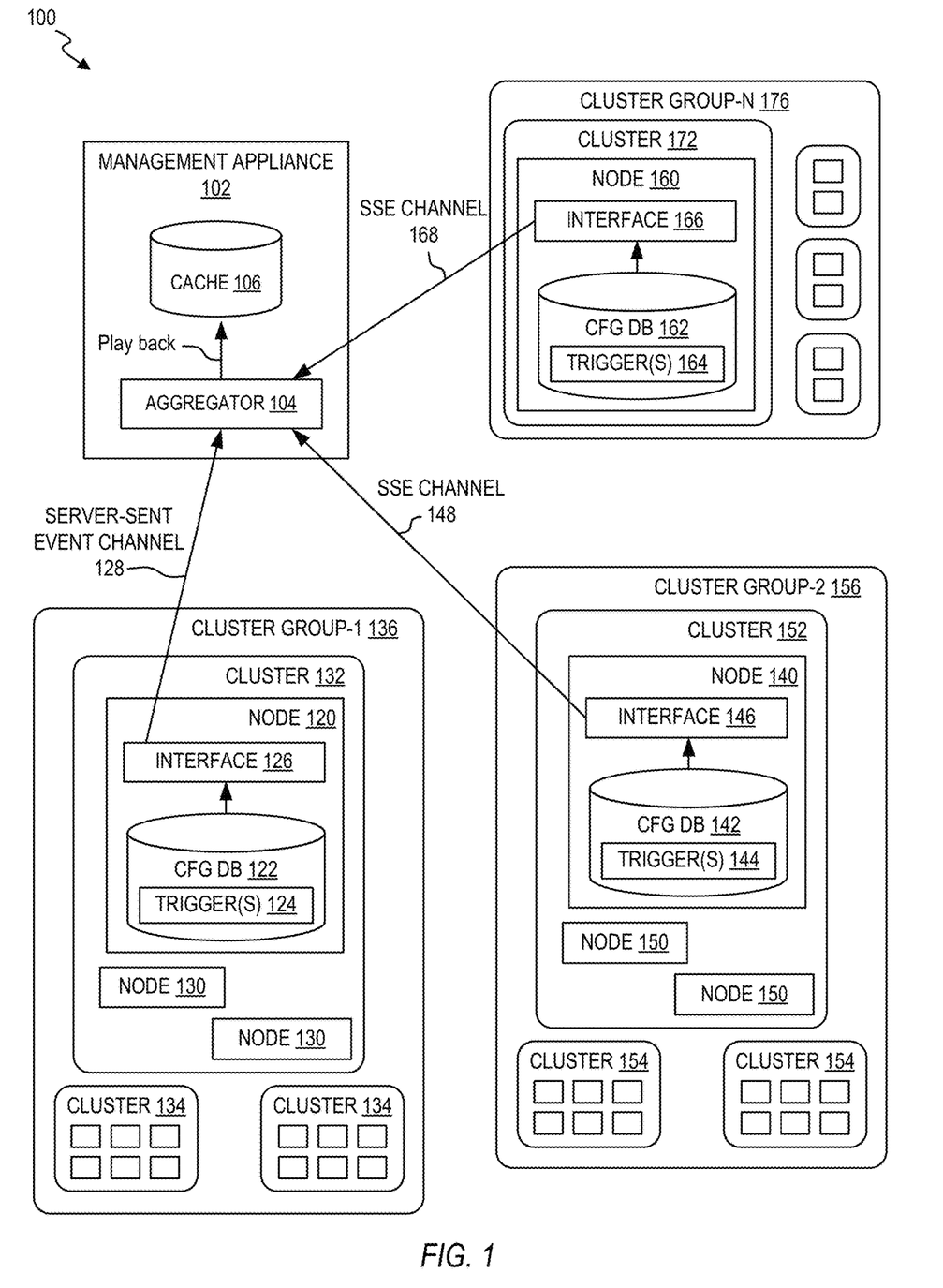
FIG. 1 is a diagram depicting an example environment with an aggregator to maintain a centralized configuration database cache for cluster groups.

Referring now to the figures, FIG. 1 is a diagram depicting an example environment 100. The environment 100 includes a plurality of example nodes 120, 130, 140, 150, 160. The nodes may be hardware-based electronic computing systems, such as servers, storage systems, hyperconverged systems, etc., or any combination thereof. In a particular example, a node may be a hyperconverged system with hardware resources (e.g., processor, memory, storage, network adapter, etc.) having a virtualized execution environment comprised of virtual machines running on a hypervisor. A hyperconverged node also may have a virtual controller, which may be implemented as a virtual machine, to provide software-defined storage capabilities, such as an object-based storage where all data is stored as objects in an object store, and objects are identified by a signature (e.g., a cryptographic hash) and are related in a hierarchical arrangement (e.g., a Merkle tree). An example hyperconverged node will be described further below with respect to FIG. 2.

Nodes may be organized into clusters. For example, a cluster 132 may be formed from node 120 and nodes 130. Similarly, cluster 152 may comprise node 140 and nodes 150, and cluster 172 may comprise node 160 and other nodes (not shown). In some implementations, clusters may be organized into cluster groups. For example, cluster 132 and clusters 134 may be organized into a cluster group-1 136, cluster 152 and clusters 154 may be organized into a cluster group-2 156, and cluster 172 and other clusters may be organized into cluster group-N 176. In some examples, a cluster may exist without being a member of any cluster group. Other examples of an environment 100 may include more or fewer nodes, clusters, or cluster groups than depicted in FIG. 1.

In the environment 100, a management appliance 102 serves as a centralized manager for governing a plurality of independent cluster groups, a plurality of clusters (e.g., including clusters that are not a member of a cluster group), or a combination thereof. Thus, the management appliance 102 may be in communication with the plurality of nodes 120, 130, 140, 150, 160. The collection of cluster groups, clusters, and nodes that a management appliance 102 governs is referred to as a federation.

The management appliance 102 may be implemented as or on a hardware device (e.g., a server or other computing device) that includes, for example, a processor, a memory, and/or a storage medium. In some implementations, the management appliance 102 may be implemented using a combination of hardware (e.g. a processor) and programming (i.e., instructions on a non-transitory machine readable medium), and may run as an application on bare metal, in a virtual machine, in containers, in the cloud (e.g., software-as-a-service), etc.

The management appliance 102 includes an aggregator 104 for synchronizing configuration database information from the clusters and cluster groups into a centralized configuration database cache 106 (also referred to as cache 106 herein for convenience), as will be described below. Thus, the centralized configuration database cache 106 contains configuration information encompassing independent clusters and cluster groups. The aggregator 104 may be a subcomponent of the management appliance 102, and may be implemented as hardware or a combination of hardware and programming. The cache 106 may be a database (e.g., SQL) stored on a storage medium or other machine readable medium.

In the environment 100, some or all of the nodes may have various associated configuration information. For example, the configuration information may include metadata (e.g., name/ID, date/timestamp, size, status, parameters) about components or mechanisms of a node or cluster. Different components or mechanisms may have different types of metadata. In an example environment where a node is a hyperconverged system, configuration information may relate to components or mechanisms such as the node itself, data backups, object trees (i.e., the aforementioned hierarchical arrangement of data objects), zones, demuxers, backup policies and parameters, file system (NFS) clients, time zone, software versions, network interfaces, and others. Configuration information may be stored in tables (e.g., key-value store, SQL table, etc.) in a configuration database maintained at a node, and in an implementation, the configuration information of each component or mechanism may be represented by a different table in the configuration database.

The configuration information of nodes within a cluster and within a cluster group may be maintained in a consistent, synchronized state among those nodes. In other words, each of the nodes in the cluster or cluster group may have a representation of configuration information for all member nodes of the cluster or cluster group. In an implementation, the nodes in a cluster or cluster group may utilize a distributed consensus protocol (e.g., Paxos) to agree on the order and content of read, modify, and reconfigure operations that affect the nodes, thus keeping the nodes consistent and synchronized (also referred to as state machine replication).

For example, the node 120 includes a configuration database 122 (abbreviated as "CFG DB" in FIG. 1) that includes configuration information for the nodes of cluster 132, as well as the nodes of other clusters in cluster group-1 136 (i.e., nodes of clusters 134). Others of the nodes in cluster group-1 136 may have a consistent configuration database as well. Similarly, the node 140 includes a configuration database 142 that includes configuration information for the nodes of cluster group-2 156, and the node 160 includes a configuration database 162 that includes the configuration information for the nodes of cluster group-N 176. In some implementations, cluster groups may be independent of each other, such that configuration information is not shared or consistent among different cluster groups. However, in some instances, a node or cluster may be a member of multiple cluster groups, and in such cases, configuration information of those nodes or clusters may be represented in the configuration databases of the multiple cluster groups.

Changes made to the configuration database 122 (e.g., via the consensus protocol) are registered in a transaction log table, which itself may be stored in the configuration database 122. The transaction log table represents changes to the configuration database 122, and entries in the transaction log table (the entries are also referred to herein as "transaction log information") are in chronological order or include a sequence number for ordering. The transaction log information may be in the form of database statements (e.g., SQL statements).

The configuration databases in environment 100 include predefined trigger(s). For example, a predefined trigger or triggers 124 may be included in the configuration database 122 (similarly, configuration database 142 includes trigger(s) 144 and configuration database 162 includes trigger(s) 164). In particular, the trigger(s) 124 may be registered to the transaction log table and may fire in response to events (i.e., changes) in the transaction log table, which may be more efficient than having triggers throughout the entire configuration database 122. The trigger(s) 124 may be configured to generate an action such as a notification to an external listener when certain events occur, such as an insert, update, or delete database statement directed to one or more of the component or mechanism related tables described above. The events for which the trigger(s) 124 are configured may be reflective of the type of information that is desirable to be synchronized to the aggregator 104, and may be predefined by, for example, an administrator or user of the environment 100 or a manufacturer or supplier of the environment 100 or components thereof. A trigger 124, 144, 164 that has been activated may cause (e.g., via a notification) an interface 126, 146, 166 of the node 120, 140, 160 to send the transaction log information that activated the trigger to the aggregator 104, as will be described.

The management appliance 102 and the aggregator 104 in particular may first perform an initialization with respect to a cluster or cluster group with which the aggregator 104 is to synchronize. Initialization may be performed with each cluster or cluster group (e.g., cluster group-1 136, cluster group-2 156, cluster group-N 176) as the cluster or cluster group is discovered by the aggregator 104, or in response to other conditions, such as synchronization failure recovery.

In the initialization phase, the management appliance 102 may discover a topology of the federation, which may include discovering the topology of the plurality of independent cluster groups 136, 156, 176 that form the federation, the clusters 132, 134, 152, 154, 172 within each of the independent cluster groups 136, 156, 176, and the nodes 120, 130, 140, 150, 160 within each of the clusters. In some configurations, a topology may also include a node or cluster that is not a member of a cluster group or is a member of multiple cluster groups. A topology may include the membership of each cluster group. In some implementations, topology may be automatically and dynamically discovered. For example, where nodes are hyperconverged systems, the management appliance 102 may contact a virtual machine management utility or interrogate virtual machine identifiers to discover topology. In implementations, topology discovery may be performed periodically or responsive to federation change events, such that the management appliance 102 has the most up to date topology information.

Based on discovered topology, the aggregator 104 may select nodes in the federation with which to synchronize configuration database information. As described above, in any given cluster or cluster group, each node in that cluster or cluster group may have a configuration database that is consistent or synchronized with other configuration databases in the cluster or cluster group. Thus, the aggregator 104 can select a node from each different respective cluster group to represent that cluster group. In some implementations, the aggregator 104 selects a representative node at random from the constituent nodes of a cluster group, as indicated by the discovered topology. In some implementations, the aggregator 104 may select a representative node intelligently, such as by finding a low latency node, finding a node with low utilization, based on software or firmware version (e.g., finding a node with the latest version of a hyperconverged virtual controller), etc. For example, in example environment 100, the aggregator 104 has selected node 120 to represent cluster group-1 136, node 140 to represent cluster group-2 156, and node 160 to represent cluster group-N 176.

Once a representative node has been selected, the management appliance 102 may establish a persistent communication channel with the selected node. In some implementations, the management appliance 102, and in particular the aggregator 104, may establish a respective server-sent event (SSE) channel using REST (Representational State Transfer) over HTTPS between the aggregator 104 and each node that represents a cluster or a cluster group. For example, the aggregator 104, as a client, establishes an SSE channel 128 with an interface 126 of node 120, an SSE channel 148 with an interface 146 of node 140, and an SSE channel 168 with an interface 166 of node 160. For example, the interfaces 126, 146, 166 may be REST interfaces. With respect to the SSE channels 128, 148, 168, the nodes 120, 140, 160 act as servers that push data out to the aggregator 104 as a one-way data flow. In some examples, the HTTPS port at the node interfaces 126, 146, 166 may be secured for other communication in addition to configuration database synchronization via server-sent events.

The aggregator 104 may initialize the centralized configuration database cache 106 by importing a database schema into the cache 106 from each of the nodes 120, 140, 160 selected to represent a cluster or cluster group. For example, a database schema may describe how data is organized, and may include tables, fields, relationships, etc. In some implementations, schema for the different representative nodes 120, 140, 160 may be maintained at the same version, and thus a common schema may be readily imported into the cache 106. In other implementations, the aggregator 104 may resolve differences in schema between the different representative nodes 120, 140, 160.

Once the schemas for the nodes 120, 140, 160 have been imported into the centralized configuration database cache 106, the aggregator 104 may copy a configuration database snapshot from the nodes 120, 140, 160 into the configuration database cache 106. For example, the nodes 120, 140, 160 may create snapshots of tables from their configuration databases 122, 142, 162 and send the snapshot to the aggregator 104, and the aggregator may subsequently copy or dump the snapshot into the cache 106. The tables to be capture in a snapshot may be predefined in a similar manner to the trigger(s) described above, and moreover, the tables may correspond to the types of trigger(s). In this manner, the cache 106 may be initialized to a baseline, and real-time synchronization between the aggregator 104 and the nodes 120, 140, 160 can take over. Such initialization may be performed for the nodes 120, 140, 160 together or separately at different times.

An example of synchronization will now be described with respect to cluster group-1 136 and representative node 120, although it should be understood that a similar synchronization may occur asynchronously or synchronously with the cluster group-2 156 and its representative node 140 and cluster group-N 176 and its representative node 160. As the trigger(s) 124 are activated, the node 120 sends the associated transaction log information representing changes to the configuration database 122 identified by the predefined trigger(s) 124 (and by extension, representing configuration database changes associated with the cluster group-1 136) via interface 126 and SSE channel 128. The sent transaction log information is in the form of database statements.

The aggregator 104 receives the transaction log information and plays back the received transaction log information into the centralized configuration database cache 106. The transaction log information may be received in sequential (i.e., chronological) order from the nodes 120, 140, 160, and played back in order into the centralized configuration database cache 106. Because the transaction log information are database statements, the aggregator 104 may execute (i.e., play back) the transaction log information as database statements against the cache 106 without interpretation (i.e., parsing, conversion, etc.) of the transaction log information. In some implementations, the aggregator 104 may utilize Java Database Connectivity (JDBC) to execute the transaction log information into the cache 106. In contrast to the aggregator 104, other approaches to synchronization may comprise receiving and then parsing JSON or XML transaction backups to create database statements that can be executed into a cache, which may be less efficient than the aggregator 104 owing to additional processing and domain knowledge involved.

Accordingly, configuration database information associated with each cluster and cluster group 136, 156, 176 in a federation may be continuous synchronized in real-time to a centralized configuration database cache 106. However, in some cases, synchronization become interrupted when an SSE channel fails, e.g., by disconnection or other error. An example illustrating a failure of SSE channel 128 will now be described. The aggregator 104 may recover from a failure in an SSE channel 128 with a node 120 by first reestablishing an SSE channel with the cluster group-1 136 that was synchronizing via the failed SSE channel 128. In some implementations, the aggregator 104 may rediscover the federation topology in response to the SSE channel failure. The aggregator 104 may attempt to reestablish an SSE channel with the node 120 with which the aggregator 104 previously communicated, or failing that (e.g., if the node 120 is in a failed or offline state), the aggregator 104 may attempt to establish an SSE channel with a different node (e.g., 130) in the cluster group-1 136, which may be based on a rediscovered topology.

The aggregator 104 clears at least a portion of the centralized configuration database cache 106 that is related to the cluster group-1 136 associated with the SSE channel 128 failure. The aggregator 104 may then reinitialize the centralized configuration database cache 106 with a new configuration database snapshot received from the node with which the SSE channel is reestablished. Clearing and reinitializing the cache 106 in this manner may be useful for ensuring that the cache is in a known state after the failure. In some implementations, the entire cache 106 may be cleared and reinitialized in response to a failure in any SSE channel. In other implementations, the cache 106 may be partitioned by cluster group or by SSE channel, such that cache 106 clearing and reinitialization may be confined to the failure. After reestablishing an SSE channel and reinitializing the cache 106, real-time continuous synchronization may again continue with cluster group-1 136.

Figure 2:
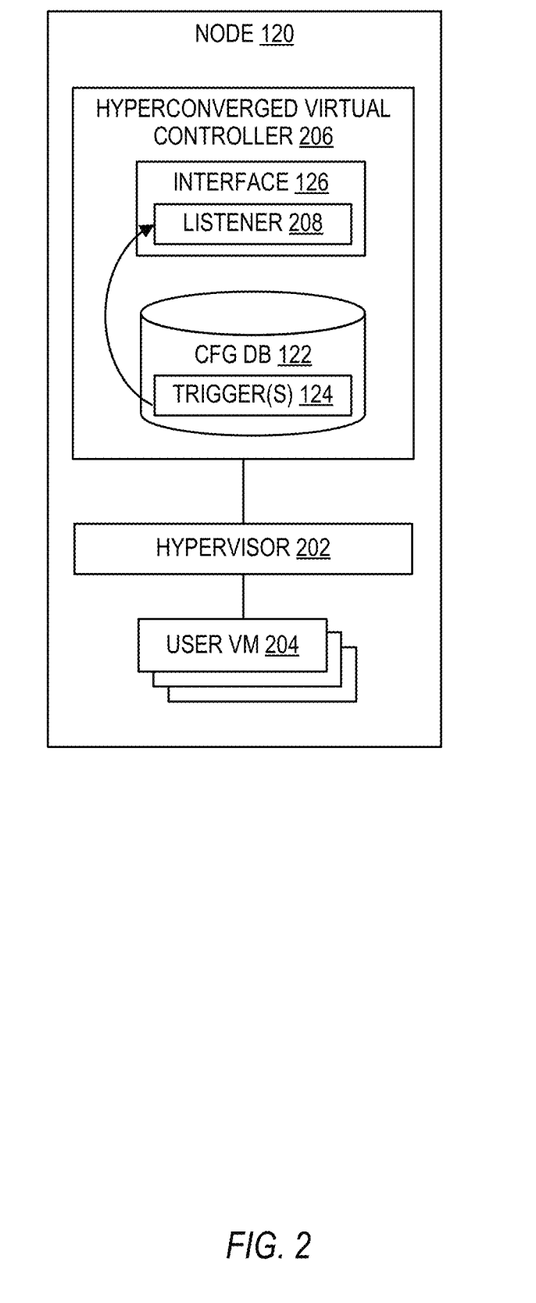
FIG. 2 is a diagram depicting an example node that communicates with an aggregator to maintain a centralized configuration database cache.

Referring now to FIG. 2, an example implementation of the node 120 will be described. The node 120 of FIG. 2 may be a hyperconverged system. The node 120 may include a hypervisor 202 upon which user virtual machines 204 may run. The node 120 also may include a hyperconverged virtual controller 206, which may be implemented as a virtual machine running on the hypervisor 202. A hyperconverged virtual controller 206 may provide software-defined storage capabilities, including distributed storage that is consumed by the user virtual machines 204. The hyperconverged virtual controller 206 includes or has access to the configuration database 122, and the hyperconverged virtual controller 206 may participate in a distributed consensus protocol with other nodes in a cluster or cluster group to which the node 120 belongs (e.g., cluster group-1 136 in FIG. 1) to maintain consistency of data in the configuration database 122.

The interface 126 may be included in the hyperconverged virtual controller 206, and may be a REST interface for example. The interface 126 may include a listener 208 (e.g., a TCP listener) to receive notifications from the configuration database trigger(s) 124. Responsive to the listener 208 receiving a notification, the interface 126 may then send corresponding transaction log information to the aggregator 104 via the SSE channel 128 as described above.

Figure 3:
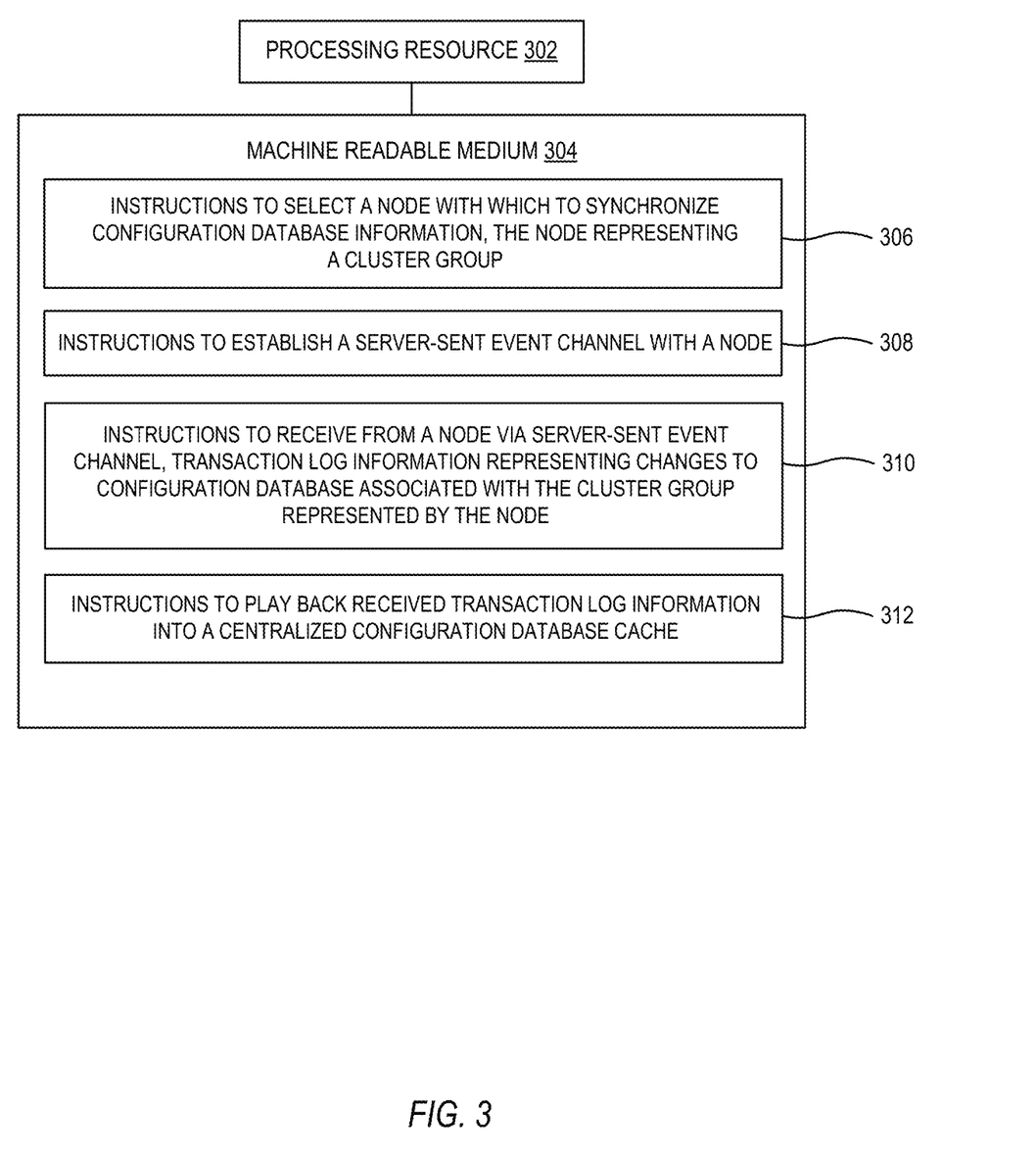
FIG. 3 is a block diagram of an example that includes a non-transitory, machine readable medium encoded with instructions to play back transaction log information into a centralized configuration database cache.

FIG. 3 is a block diagram of an example that includes a processing resource 302 coupled to a non-transitory, machine readable medium 304 encoded with example instructions. The processing resource 302 may include a microcontroller, a microprocessor, central processing unit core(s), an application-specific integrated circuit (ASIC), a field programmable gate array (FPGA), and/or other hardware device suitable for retrieval and/or execution of instructions from the machine readable medium 304 to perform functions related to various examples. Additionally or alternatively, the processing resource 302 may include electronic circuitry for performing the functionality of the instructions described herein.

The machine readable medium 304 may be any medium suitable for storing executable instructions, such as random access memory (RAM), read-only memory (ROM), electrically erasable programmable read-only memory (EEPROM), flash memory, a hard disk drive, an optical disc, or the like. The machine readable medium 304 may be disposed within a system, in which case the executable instructions may be deemed "installed" or "embedded" on the system. Alternatively, the machine readable medium 304 may be a portable (e.g., external) storage medium, and may be part of an "installation package."

As described further herein below, the machine readable medium 304 may be encoded with a set of executable instructions 306, 308, 310, 312. It should be understood that part or all of the executable instructions and/or electronic circuits included within one box may, in alternate implementations, be included in a different box shown in the figures or in a different box not shown. The instructions 306, 308, 310, 312 may be useful for implementing aspects of the management appliance 102 and the aggregator 104.

Instructions 306, when executed, cause the processing resource 302 to select nodes with which to synchronize configuration database information. Each of the selected nodes represents a different respective cluster group of a plurality of independent cluster groups.

Instructions 308, when executed, cause the processing resource 302 to establish a respective server-sent event (SSE) channel with each of the nodes selected by instructions 306. Each node acts as a server for the respective SSE channel.

Instructions 310, when executed, cause the processing resource 302 to receive, from a node selected by instructions 306 via the respective server-sent event channel for the node, transaction log information representing changes to a configuration database associated with the cluster group represented by that node. The transaction log information may be in the form of database statements. Instructions 310 may be performed continuously, in real-time, and with respect to each node with which a SSE channel has been established by execution of instructions 308.

For example, the nodes may include predefined trigger(s) in their configuration databases for types of changes for which transaction log information is to be sent via the respective server-sent event channel. For example, predefined triggers may include triggers related to database statements including insert, update, and delete. In some examples, predefined triggers may also relate to database statements associated with virtual machine backup policies. Execution of instructions 310 may include receiving the transaction log information sent by nodes in response to activation of the predefined trigger(s).

Instructions 312, when executed, cause the processing resource 302 to play back transaction log information received by execution of instructions 310 into a centralized configuration database cache. More particularly, instructions 312 causes play back of the received transaction log information into the centralized configuration database cache directly without interpreting, parsing, or converting the transaction log information. For example, play back may include executing transaction log information, which is in the form of database statements, directly against the centralized configuration database cache.

Figure 4:
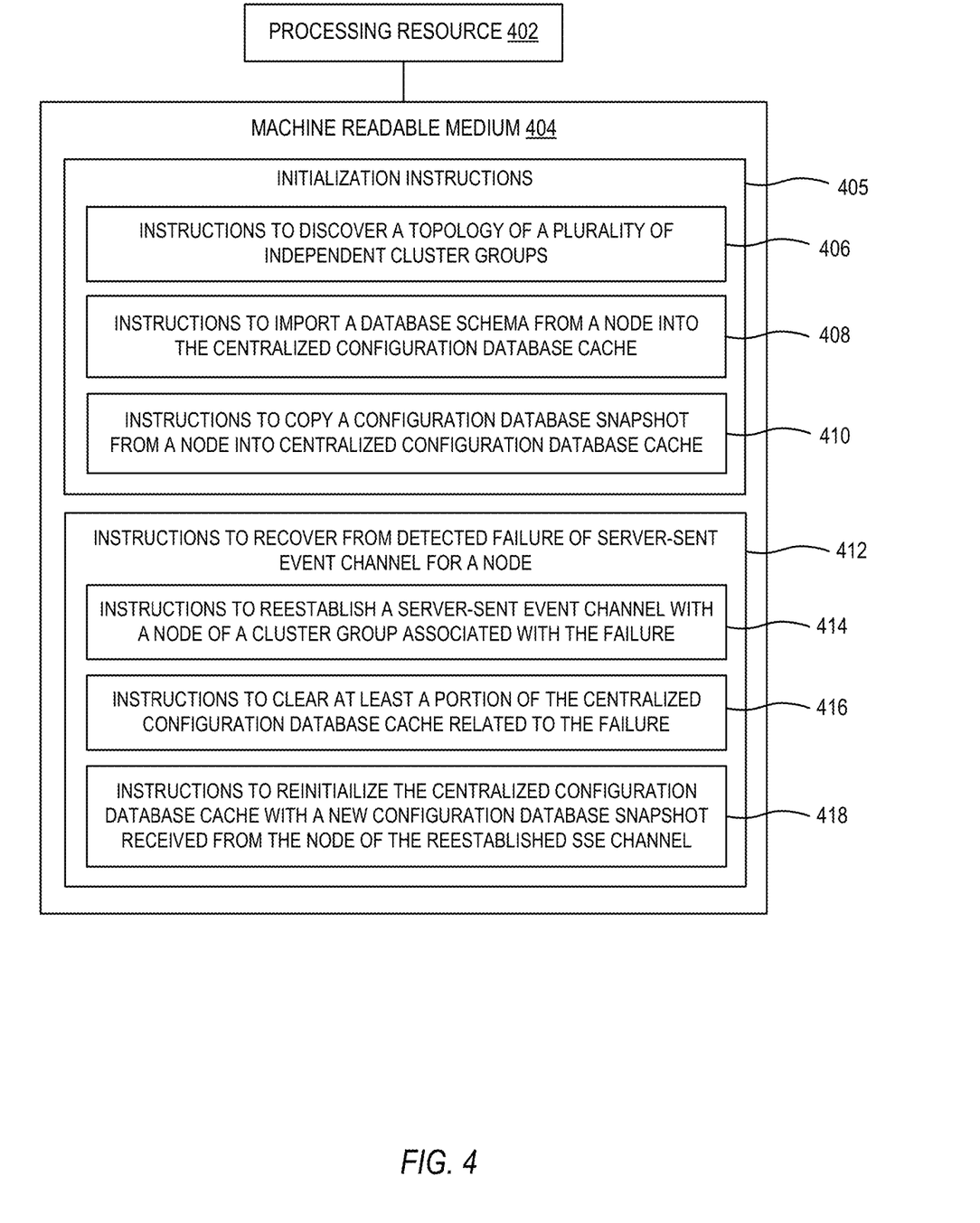
FIG. 4 is a block diagram of an example that includes a non-transitory, machine readable medium encoded with initialization instructions and instructions to respond to a synchronization failure.

FIG. 4. depicts a processing resource 402 coupled to a non-transitory, machine readable medium 404 encoded with example instructions. The processing resource 402 and the machine readable medium 404 may be analogous in many respects to the processing resource 302 and the machine readable medium 304, respectively.

The machine readable medium 404 may be encoded with a set of executable instructions 406, 408, 410, 414, 416, 418. It should be understood that part or all of the executable instructions and/or electronic circuits included within one box may, in alternate implementations, be included in a different box shown in the figures or in a different box not shown. Some implementations of may include more or fewer instructions than are shown in FIG. 4. In some implementations, one or more of the instructions 406, 408, 410, 414, 416, 418 may operate in combination (e.g., sequentially or concurrently) with one or more of the instructions 306, 308, 310, 312 described with respect to FIG. 3. In some implementations, the instructions 406, 408, 410, 414, 416, 418 may be useful for implementing aspects of the management appliance 102 and the aggregator 104.

Instructions 406, 408, 410 may form a set of initialization instructions 405 to set up an aggregator and a centralized configuration database cache prior to real-time, continuous synchronization with nodes representing clusters or cluster groups. Instructions 406, when executed, may cause the processing resource 402 to discover a topology of a federation that includes a plurality of independent cluster groups, clusters within each of the independent cluster groups, nodes within each of the clusters, or any variations thereof. The discovered topology may be useful as an input to instructions 306 to select nodes with which to synchronize configuration database information. For example, instructions 306 may select a node from each independent cluster group found in the discovered topology. The node may be a randomly selected node from the cluster group, or may be intelligently selected based on other criteria of the discovered topology.

Instructions 408, when executed, may cause the processing resource 402 to import a database schema from each of the nodes (i.e., nodes selected by instructions 306) into the centralized configuration database cache. Instructions 410, when executed, may cause the processing resource 402 to copy a configuration database snapshot received from each node (i.e., of nodes selected by instructions 306) into the centralized configuration database cache to initialize the centralized configuration database cache.

Instructions 414, 416, 418 may form a set of instructions 412 to recover from a detected failure of a server-sent event channel. The set of instructions 412 may include instructions (not shown) to detect a failure in an SSE channel, which may involve receiving an error message. Instructions 414, when executed, may cause the processing resource 402 to reestablish a server-sent event channel with a node of the cluster group associated with the failure. In some implementations, instructions 414 may include rediscovering the topology (e.g., re-executing instructions 406) and either attempting to reestablish the previous node with which the failed SSE channel was established or establishing an SSE channel with a different node of the same cluster group (e.g., if the previous node is unreachable).

Instructions 416, when executed, may cause the processing resource 402 to clear at least a portion of the centralized configuration database cache related to the cluster group associated with the failure. Instructions 418, when executed, may cause the processing resource 402 to reinitialize the centralized configuration database cache with a new configuration database snapshot received from the node with which the server-sent event channel is reestablished by instructions 414. After execution of the instruction set 412, synchronization with the cluster group associated with the SSE failure may resume by execution of instructions 310 and 312.

Figure 5:
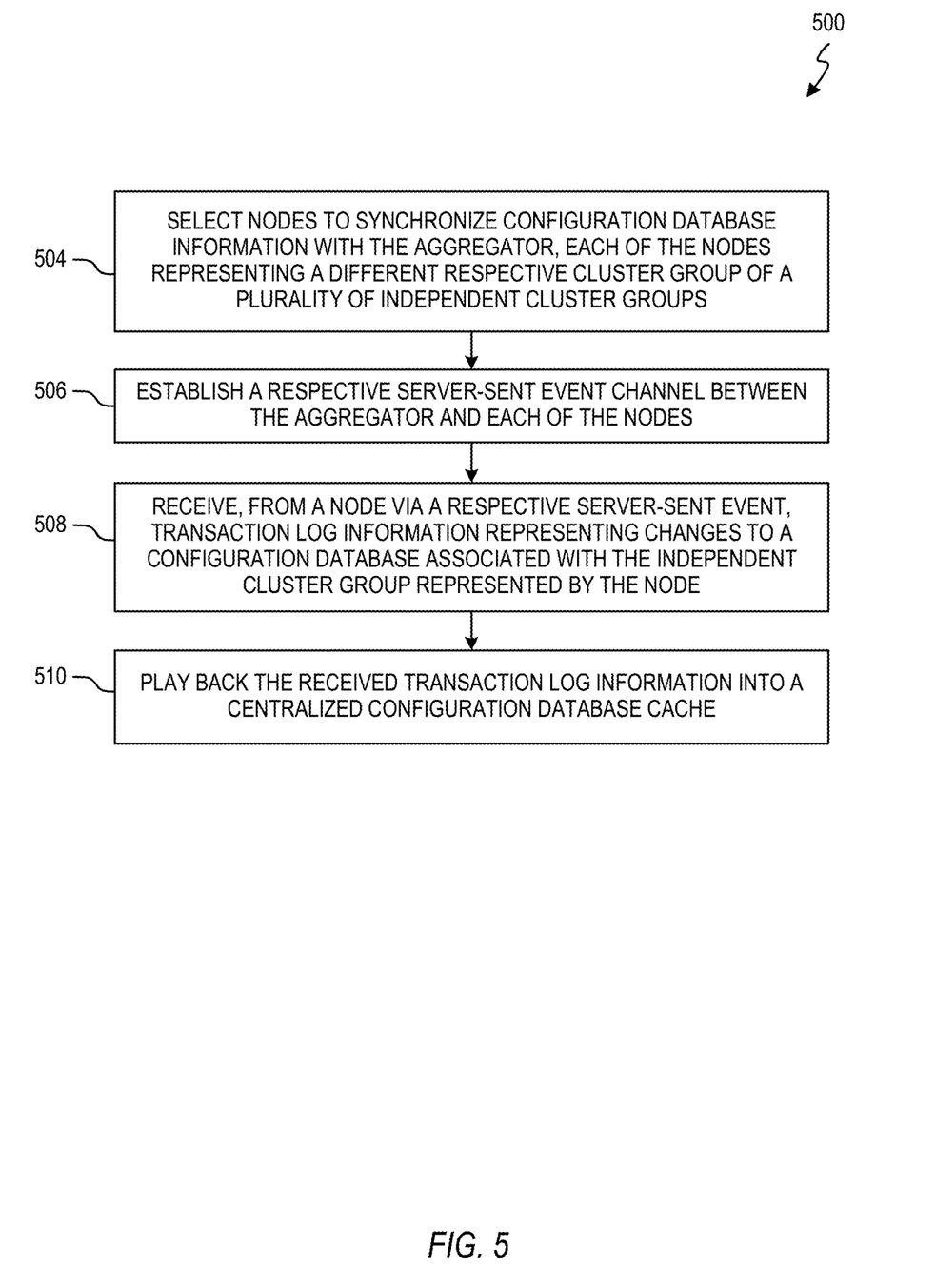
FIG. 5 is a flow diagram depicting an example method that includes receiving transaction log information from a node and playing the information back into a centralized configuration database cache.
Figure 6:
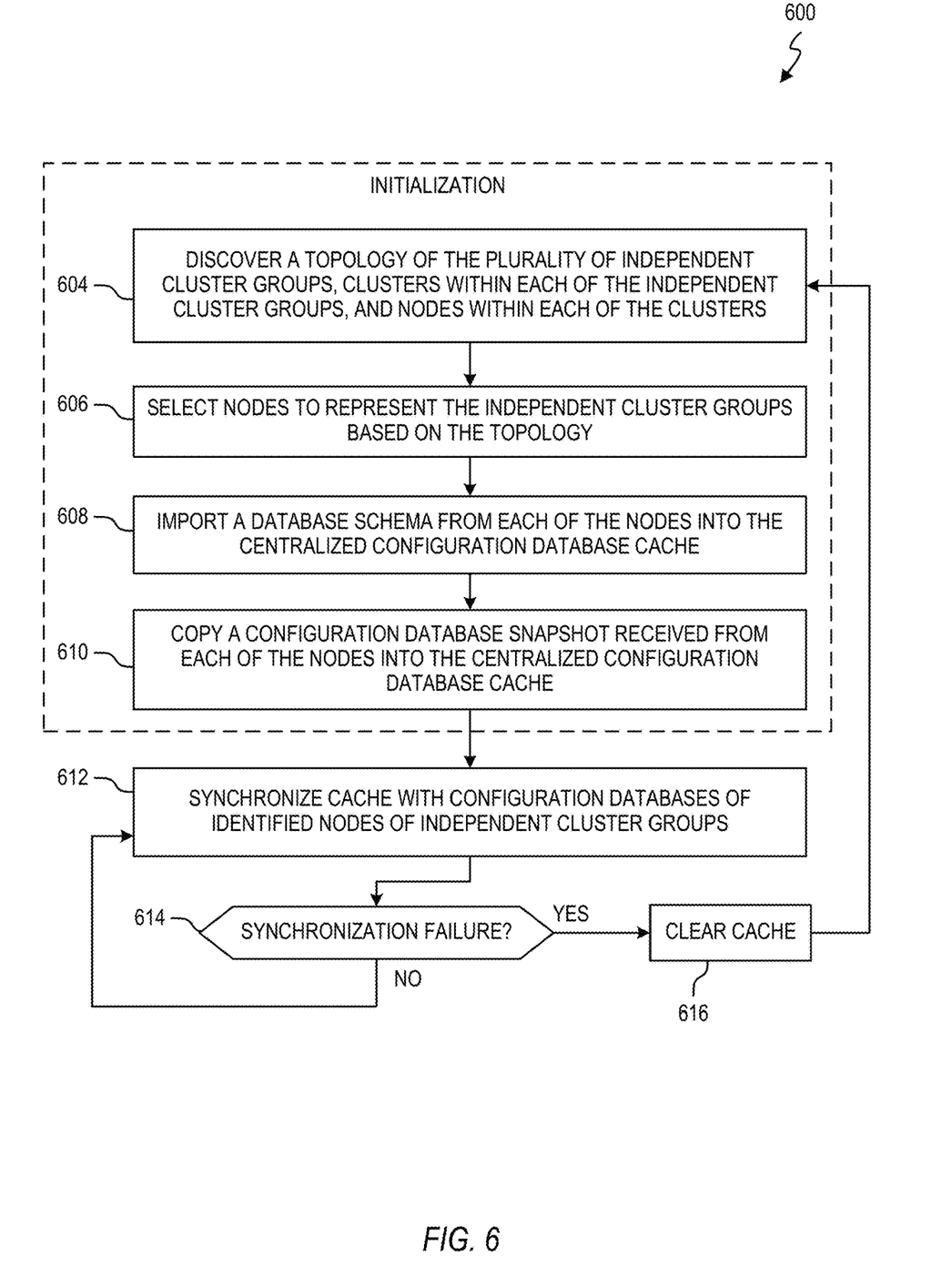
FIG. 6 is a flow diagram depicting an example method to initialize for configuration database information synchronization and to manage a synchronization failure.

FIGS. 5 and 6 are flow diagrams depicting various example methods. In some implementations, one or more blocks of a method may be executed substantially concurrently or in a different order than shown. In some implementations, a method may include more or fewer blocks than are shown. In some implementations, one or more of the blocks of a method may, at certain times, be ongoing and/or may repeat. The methods may be implemented in the form of executable instructions stored on a machine readable medium (e.g., such as medium 304 or 404) and executed by a processing resource (e.g., such as processing resource 302 or 402) and/or in the form of electronic circuitry. In some examples, aspects of the methods may be performed by the management appliance 102 and/or the aggregator 104.

FIG. 5 is a flow diagram depicting an example method 500 that includes receiving transaction log information from a node and playing the information back into a centralized configuration database cache. At block 504, an aggregator of a management appliance selects nodes with which to synchronize configuration database information. Each of the selected nodes represents a different respective cluster group of a plurality of independent cluster groups. In some implementations, the aggregator may select a node to represent an independent cluster.

In some implementations, a node may include a hyperconverged virtual controller that is different from user virtual machines of the node. The hyperconverged virtual controller may provide or cooperate with software-defined infrastructure functionality, such as distributed storage, virtualization, cluster management, and the like. The node may have a configuration database storing configuration information for the cluster or cluster group of which the node is a member, and the configuration database may be maintained in a consistent state by the hyperconverged virtual controller via distributed consensus among nodes of the cluster or cluster group.

At block 506, the aggregator establishes a respective server-sent event channel between the aggregator and each of the nodes selected at block 504. With respect to the SSE channels, the nodes are configured to be servers and the aggregator is configured as the client.

At block 508, the aggregator receives, from a node via the SSE channel established with the node at block 506, transaction log information representing changes to a configuration database associated with the independent cluster group represented by the node. The configuration database may be maintained at the node and may have configuration information about all nodes in the cluster group represented by the node by virtue of a distributed consensus protocol among nodes of the cluster group. The node may include trigger(s) in the configuration database that activate for certain predefined events (i.e., changes to the configuration database caused by insert, update, delete statements), and the trigger(s) may cause the node to send corresponding transaction log information in the form of database statements to the aggregator to be received at block 508. In some implementations, the transaction information is sent to the aggregator via the SSE channel by an interface (e.g., REST interface) of a hyperconverged infrastructure virtual controller of the node.

At block 510, the aggregator plays back the transaction log information received at block 508 into a centralized configuration database cache maintained by the aggregator. The playing back may be an execution of the transaction log information (received from the node as database statements) directly into the centralized configuration database cache without any interpreting, parsing, converting, or the like. Blocks 508 and 510 may be performed in real-time whenever any of the nodes selected in block 504 transmit transaction log information to the aggregator. In this manner, the aggregator may maintain a centralized configuration database cache that consolidates configuration information of independent clusters or cluster groups that otherwise do not communicate with each other.

FIG. 6 is a flow diagram depicting an example method 600 to initialize for configuration database information synchronization and to manage a synchronization failure. In particular, blocks 604, 606, 608, 610 may be useful for initializing or reinitializing the aggregator for configuration database synchronization.

At block 604, a management appliance discovers a topology of a federation managed by the management appliance. The federation may include a plurality of independent cluster groups, clusters within each of the independent cluster groups, and nodes within each of the clusters. At block 606, an aggregator selects nodes to represent each of the independent cluster groups based on the topology discovered at block 604. The aggregator may also establish SSE channels with the selected groups, in a manner similar to that described above with respect to block 506.

At block 608, the aggregator imports a database schema from each of the selected nodes (i.e., selected at block 606) into the centralized configuration database cache. At block 610, the aggregator copies a configuration database snapshot from each of the selected nodes into a centralized configuration database cache to initialize the centralized configuration database cache.

At block 612, the aggregator synchronizes the centralized configuration database cache with configuration databases of the selected nodes, which represent respective clusters or cluster groups. For example, block 612 may be analogous in many respects to blocks 508 and 510 described above.

At block 614, if no synchronization failures have occurred ("NO" at block 614), the aggregator repeats block 612 to continue synchronizing the centralized configuration database cache. If the aggregator detects that a synchronization failure has occurred ("YES" at block 614), the aggregator attempts to recover from the failure. An example failure may include an SSE channel error/failure or a node becoming unreachable. To recover from a synchronization failure, the aggregator may proceed to reinitialize, at least as to the mechanisms related to the failure. For example, at block 616, the aggregator may clear the centralized configuration database cache. In some implementations, the entire cache is cleared. In other implementations, a portion of the cache related to the failure is cleared (e.g., a partition of configuration data related to the cluster or cluster group that was previously synchronized via the failed SSE channel or node).

The aggregator may then proceed to rediscover topology and reinitialize the centralized configuration database cache by performing blocks 604, 606, 608, 610, with respect to the entire federation or to the failed domain, depending on implementation. After reinitializing, the aggregator may return to real-time synchronization at block 612.

In the foregoing description, numerous details are set forth to provide an understanding of the subject matter disclosed herein. However, implementation may be practiced without some or all of these details. Other implementations may include modifications and variations from the details discussed above. It is intended that the following claims cover such modifications and variations.

What is claimed:

1. A method comprising:
   selecting, by an aggregator in a management appliance, nodes to synchronize configuration database information with the aggregator, each of the nodes representing a different respective cluster group of a plurality of independent cluster groups;
   establishing, by the aggregator, a respective server-sent event channel between the aggregator and each of the nodes;
   receiving, by the aggregator and from a node of the nodes via the respective server-sent event channel for the node, transaction log information representing changes to a configuration database associated with the independent cluster group represented by the node, the transaction log information being in the form of database statements; and
   playing back, by the aggregator, the received transaction log information into a centralized configuration database cache.

2. The method of claim 1, further comprising discovering, by the management appliance, a topology of the plurality of independent cluster groups, clusters within each of the independent cluster groups, and nodes within each of the clusters,
   wherein the selecting is based on the topology as discovered.

3. The method of claim 1, further comprising, prior to the receiving:
   importing, by the aggregator, a database schema from each of the nodes into the centralized configuration database cache; and
   copying, by the aggregator, a configuration database snapshot received from each of the nodes into the centralized configuration database cache to initialize the centralized configuration database cache.

4. The method of claim 1, wherein the playing back does not include interpreting the transaction log information.

5. The method of claim 1, wherein the node includes predefined triggers in the configuration database for types of changes for which transaction log information is sent to the aggregator.

6. The method of claim 1, wherein
   the node includes a hyperconverged virtual controller different from ua of the node,
   the configuration database is maintained in a consistent state at the hyperconverged virtual controller by distributed consensus among nodes of the cluster group represented by the node, and
   the transaction log information is sent to the aggregator via the server-sent event channel by an interface of the hyperconverged infrastructure virtual controller.

7. A system comprising:
   a management appliance that governs a federation of independent cluster groups, each of the cluster groups including a plurality of clusters of nodes, the management appliance having an aggregator to maintain a centralized configuration database cache that encompasses the independent cluster groups;
   a plurality of nodes in communication with the management appliance, each node of the plurality of nodes belonging to a different respective cluster group of the independent cluster groups, wherein each node includes:
  a configuration database maintained by distributed consensus with other nodes of the different respective cluster group to which the each node belongs, the configuration database having predefined triggers for types of changes to send to the aggregator, and
  an interface to send transaction log information representing configuration database changes identified by the predefined triggers over a server-sent event channel between the interface and the aggregator, the transaction log information being in the form of database statements,
wherein the aggregator is to play back received transaction log information from each node into the centralized configuration database cache.

8. The system of claim 7, wherein
the management appliance is to discover a topology of the federation, and
the aggregator is to select, based on the topology, node to represent the different respective cluster group.

9. The system of claim 7, wherein the aggregator is to initialize the centralized configuration database cache by:
  importing a database schema from each node into the centralized configuration database cache, and
  before playing back received transaction log information, copying a configuration database snapshot received from each node into the centralized configuration database cache.

10. The system of claim 7, wherein the triggers include database statements including insert, update, and delete, and the triggers are registered to a transaction log table of the configuration database.

11. The system of claim 7, wherein the configuration database and the interface are included in a hyperconverged infrastructure virtual controller.

12. The system of claim 7, wherein the aggregator is to play back the received transaction log information into the centralized configuration database cache directly without interpretation.

13. The system of claim 7, wherein the aggregator is to recover from a failed server-sent event channel by:
  reestablishing a server-sent event channel with a node of a cluster group associated with the failed server-sent event channel,
  clearing at least a portion of the centralized configuration database cache related to the cluster group associated with failed server-sent event channel, and
  reinitializing the centralized configuration database cache with a new configuration database snapshot received from the node with which the server-sent event channel is reestablished.

14. A non-transitory machine readable medium storing instructions of a management appliance executable by a processing resource, the medium comprising:
  instructions to select nodes with which to synchronize configuration database information, each of the nodes representing a different respective cluster group of a plurality of independent cluster groups;
  instructions to establish a respective server-sent event channel with each of the nodes;
  instructions to receive from a node of the nodes via the respective server-sent event channel for the node, transaction log information representing changes to a configuration database associated with the cluster group represented by the node, the transaction log information being in the form of database statements; and
  instructions to play back the received transaction log information into a centralized configuration database cache.

15. The non-transitory machine readable medium of claim 14, further comprising instructions to discover a topology of the plurality of independent cluster groups, clusters within each of the independent cluster groups, and nodes within each of the clusters,
wherein the instructions to select nodes utilize the topology as discovered.

16. The non-transitory machine readable medium of claim 14, further comprising:
  instructions to import a database schema from each of the nodes into the centralized configuration database cache; and
  instructions to copy a configuration database snapshot received from each node into the centralized configuration database cache to initialize the centralized configuration database cache.

17. The non-transitory machine readable medium of claim 14, wherein the node includes predefined triggers in the configuration database for types of changes for which transaction log information is sent via the respective server-sent event channel.

18. The non-transitory machine readable medium of claim 17, the predefined triggers include triggers related to virtual machine backup policies and related to database statements including insert, update, and delete.

19. The non-transitory machine readable medium of claim 14, wherein the instructions to play back aggregator is to play back the received transaction log information into the centralized configuration database cache directly without parsing.

20. The non-transitory machine readable medium of claim 14; further comprising:
  instructions to detect a failure in the respective server-sent event channel for the node; and
  instructions to, responsive to the failure:
    reestablish a server-sent event channel with a node of a cluster group associated with the failure,
    clear at least a portion of the centralized configuration database cache related to the cluster group associated with the failure, and
    reinitialize the centralized configuration database cache with a new configuration database snapshot received from the node with which the server-sent event channel is reestablished.

* * * * *